US012368240B2

(12) United States Patent
Mehmood et al.

(10) Patent No.: US 12,368,240 B2
(45) **Date of Patent: *Jul. 22, 2025**

(54) PHASED ARRAY ANTENNA DEVICE

(71) Applicant: BEIJING BOE SENSOR TECHNOLOGY CO., LTD., Beijing (CN)

(72) Inventors: Arshad Mehmood, Darmstadt (DE); Ahmet Kenan Keskin, Pendik/Istanbul (TR)

(73) Assignee: BEIJING BOE SENSOR TECHNOLOGY CO., LTD., Beijing (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/639,444

(22) Filed: Apr. 18, 2024

(65) Prior Publication Data

US 2024/0266729 A1 Aug. 8, 2024

Related U.S. Application Data

(63) Continuation of application No. 17/814,040, filed on Jul. 21, 2022, now Pat. No. 12,003,039.

(30) Foreign Application Priority Data

Jul. 23, 2021 (EP) .................................... 21187563

(51) Int. Cl.
*H01Q 3/36* (2006.01)

(52) U.S. Cl.
CPC .................................... *H01Q 3/36* (2013.01)

(58) Field of Classification Search
CPC ........ H01Q 3/36; H01Q 3/44; H01Q 21/0075; H01Q 21/065; H01Q 13/206
See application file for complete search history.

(56) References Cited

U.S. PATENT DOCUMENTS 5,878,327 A * 3/1999 Hayashi ................ H01Q 1/246 455/517
6,377,217 B1 * 4/2002 Zhu ......................... H01Q 3/36 343/771

(Continued)

FOREIGN PATENT DOCUMENTS

EP 1212809 B1 3/2004

OTHER PUBLICATIONS

Notice of Allowance mailed Jan. 31, 2024 in U.S. Appl. No. 17/814,040.

(Continued)

*Primary Examiner* — Awat M Salih
(74) *Attorney, Agent, or Firm* — Dilworth & Barrese, LLP.; Michael J. Musella, Esq.

(57) ABSTRACT

A phased array antenna device includes at least one antenna element arranged in a spatial distribution to emit and receive superposing radio frequency signals to and from different directions. Each antenna element is positioned within a corresponding unit cell. The unit cells are arranged in a non-overlapping manner next to each other. A feeding network for transmitting the antenna signals between a common feeding point and the respective antenna element includes a plurality of antenna element transmission line segments each running into an antenna element and a corresponding plurality of phase shifting devices. The feeding transmission line segments each includes more than two transition structures distributed along the feeding transmission line segment. Each transition structure provides for a signal coupling between the feeding transmission line segment and the corresponding antenna element transmission line segment, thereby connecting several antenna element transmission line segments with the same feeding transmission line segment.

8 Claims, 6 Drawing Sheets

(56) References Cited

U.S. PATENT DOCUMENTS

| | | | | |
|---|---|---|---|---|
| 2002/0126048 | A1 | 9/2002 | Zhu et al. | |
| 2006/0055604 | A1* | 3/2006 | Koenig | H01Q 21/065 343/700 MS |
| 2007/0091008 | A1 | 4/2007 | Mortazawi et al. | |
| 2014/0253408 | A1 | 9/2014 | Kikin | |
| 2016/0233589 | A1 | 8/2016 | Kim et al. | |
| 2017/0005405 | A1* | 1/2017 | Kim | H01Q 13/206 |
| 2019/0115664 | A1* | 4/2019 | Veihl | H01Q 5/50 |
| 2022/0320731 | A1* | 10/2022 | Xi | H01P 1/181 |
| 2023/0028486 | A1 | 1/2023 | Mehmood et al. | |

OTHER PUBLICATIONS

Office Action mailed Jun. 30, 2023 in U.S. Appl. No. 17/814,040.

Dr. Milton Lien et al, Count on Design Software for Millimeter-Wave Automotive Radar and Antenna System Development, Part 2, Article, Feb. 1, 2018, pp. 1-9.

* cited by examiner

PHASED ARRAY ANTENNA DEVICE

CROSS-REFERENCE TO RELATED APPLICATION

This patent application is a continuation of U.S. application Ser. No. 17/814,040 filed on Jul. 21, 2022, which claims the benefit of European Patent Application No. 21 187 563.8, filed 23 Jul. 2021, the contents of which is incorporated by reference in its entirety.

TECHNICAL FIELD

The disclosure relates to a phased array antenna device with a plurality of antenna elements arranged in a spatial distribution that is designed to allow for the phased array antenna device emitting and receiving superposing radio frequency signals to and from different directions.

BACKGROUND

A phased array antenna device operating with radio frequency signals allows for emitting a beam of radio frequency electromagnetic waves that can be electronically steered to point in different directions without moving the antenna device. Similarly, many phased array antenna devices also allow for amplifying the reception sensitivity for radio frequency waves from a certain direction without moving the antenna device.

In most phased array antenna devices, the radio frequency current from a transmitter is fed to the individual antenna elements with the correct phase relationship so that the radio frequency waves from the separate antenna elements superimpose and add together to increase the radiation intensity in a desired direction and cancel to suppress radiation intensity in undesired directions. In order to control the phase relationship between individual antenna elements, the power from the transmitter is fed to the many antenna elements through devices called phase shifters which can alter the respective phase of the corresponding antenna signals electronically. For each antenna element the correct phase relationship with respect to other antenna elements is defined and preset by the respective phase shifting device, resulting in a superimposed beam of radio frequency waves as superimposition of all radio frequency waves from all antenna elements with a peak intensity in a preset direction.

Usually, a phased array antenna device should consist of many small antenna elements, sometimes comprising more than thousand antenna elements that are arranged in a preset spatial distribution. For many phase array antenna devices, a large number of antenna elements is arranged within a plane in a matrix spatial distribution. A minimum size of the antenna elements is usually approx. $\lambda/2$ with $\lambda$ being the wavelength of the radio frequency signal that is to be emitted or received with the phased array antenna device.

For many phased array antenna devices each antenna element is arranged within a unit cell, whereby a unit cell defines a small region within a plane that is dedicated to the respective antenna element that is arranged within this plane. The plane can be segmented into a plurality of unit cells that each comprise one antenna element and usually also comprise a similar pattern of other electrodes or components, whereby the unit cells cover the plane in a non-overlapping but adjoining manner and usually in a matrix shaped arrangement. Usually a unit cell has no structural limitation, but can be seen as region around an antenna element with a repeating pattern of electrodes and other components. The extension of a unit cell in a given direction equals the distance of adjacent antenna elements in said direction.

For each unit cell, the corresponding antenna element is connected to a control unit via a corresponding antenna element transmission line segment. In case of a large number of unit cells with antenna elements, the space requirements for a corresponding number of antenna element transmission line segments become huge and significantly limit the usable space for antenna elements.

In order to reduce the total length of antenna element transmission line segments that are required for individual connections to each of the antenna elements, many phased array antenna devices comprise a corporate feed network starting from a common feeding point with a small number of first corporate feed transmission line segments each branching into two separate second corporate feed transmission line segments. The branching can be repeated several times, resulting in a corporate feed network with cascading corporate feed transmission line segments until after N branching levels the total number of final corporate feed transmission line segments equals the required number of antenna element transmission line segments each running to the corresponding antenna element.

However, in order to allow for a cost-effective manufacture of such a cascading corporate feed network, all corporate feed transmission line segments are arranged on the same surface of a substrate layer. Since an electronic steering of the phase shifter usually requires bias lines for the application of an electric field to a tunable dielectric material, also the bias lines have to be connected to each phase shifter i.e. unit cell. But any crossing of corporate feed transmission line segments with other corporate feed transmission line segments or with bias lines should be avoided. This usually requires a very long length of the bias lines between the control unit and the respective antenna elements if all such crossings are to be avoided. Therefore, such a cascading corporate feed network imposes several limitations to the design of the phased array antenna device and to the arrangement of unit cells and corresponding antenna elements. Furthermore, the total length of the resulting corporate feed transmission line segments for a signal transmission between a common feeding point and the antenna element will be quite large if crossings or overlaps of corporate feed transmission line segments are avoided. Longer transmission line segments also result in increased signal intensity losses.

SUMMARY

The present disclosure provides a more effective and space-saving arrangement of signal transmitting connections between the common feeding point and each of the antenna elements of a phased array antenna device.

The phased array antenna device has a plurality of antenna elements arranged in a spatial distribution that is designed to allow for the phased array antenna device emitting and receiving superposing radio frequency signals to and from different directions. Each antenna element is positioned within a corresponding unit cell of the phase array antenna device. The unit cells are arranged in a non-overlapping manner next to each other, with a feeding network for transmitting the antenna signals between a common feeding point and the respective antenna element. The feeding network comprises a plurality of antenna element transmission line segments each running into an antenna element, and a plurality of phase shifting devices, whereby for each antenna element a corresponding phase shifting device is arranged along the respective antenna element signal transmission line that runs into said antenna element.

The phased array antenna device comprises several feeding transmission line segments whereby each feeding transmission line segment comprises more than two transition structures distributed along the feeding transmission line segment, whereby each transition structure provides for a signal coupling into a corresponding antenna element transmission line segment, thereby connecting several dedicated antenna element transmission line segments with the same feeding transmission line segment. Contrary to a corporate feed transmission line segment that branches into two secondary corporate feed transmission line segments, the feeding transmission line segment does not branch into two secondary transmission line segments, but comprises more than two transition structures, whereby each transition structure allows for a signal coupling of the feeding transmission line segment with an antenna element transmission line segment. Thus, a single feeding transmission line segment is connected to and feeds several and possibly a large number of antenna element transmission line segments. This significantly reduces the space that is required for connecting each of the unit cells with the respective antenna element to the control unit of the phased array antenna device. Furthermore, it facilitates the control and actuation of each of the unit cells with a common signal transmission along a common feeding transmission line segment.

According to a favorable embodiment, each of the feeding transmission line segments runs along or through more than two unit cells and comprises one transition structure for each of the more than two unit cells. Thus, the distance between the feeding transmission line segment that provides for a signal transmitting connection with the control unit and each of the respective antenna elements is relatively short, which also reduces the space requirements for the antenna element transmission line segments that each connect the feeding transmission line segment with the corresponding antenna element.

According to a further aspect, each of the feeding transmission line segments runs along a straight line. Usually, the antenna elements and therefore also the unit cells are spatially positioned in a matrix shaped arrangement. For such a matrix shaped arrangement the course of the feeding transmission line segment can be a straight line that runs either between two adjacent rows of unit cells or that traverses many unit cells along a straight line of unit cells within the matrix shaped arrangement of unit cells. Feeding transmission line segments that run along a straight line also reduce the unwanted emission of electromagnetic radiation that is caused by bends or corners within the course of a transmission line.

According to an advantageous embodiment, the feeding transmission line segments are implemented as microstrip transmission lines with a line shaped microstrip electrode arranged at a distance to a ground electrode. A microstrip line and transition structures for signal coupling into antenna element transmission line segments are easy to manufacture. Furthermore, a ground electrode that is required for a microstrip line can be useful in order to provide for a back shield that prevents electromagnetic radiation emissions away from the intended direction and towards a back side of the unit cell arrangement.

In yet another and also favorable embodiment, the feeding transmission line segments are implemented as differential pair transmission lines with two similar differential pair electrodes running along the feeding transmission line segment. Differential pair transmission lines do not require a ground electrode, which allows for more options for the design of the phased array antenna device. For example, the ground electrode can be placed at any distance from the radiating element without regard to the feeding transmission line segments. Furthermore, the signal transmission along a differential pair transmission line is less affected by interfering electromagnetic radiation emissions that occur within the phased array antenna device and that cannot be fully avoided. In addition, it is considered advantageous for the antenna element transmission line segments to be designed as differential pair transmission lines as well. Then, the transition structure that is required for signal coupling between the feeding transmission line segment and the antenna element transmission line segments does not require a change of type of transmission line from microstrip transmission line to differential pair transmission line.

It is considered a very advantageous aspect that each of the antenna element transmission line segments can be implemented as differential pair transmission line with two similar differential pair electrodes running along the antenna element transmission line segment, whereby at least one of the two differential pair electrodes of the antenna element transmission line segment is electrically isolated from the corresponding feeding transmission line segment. As at least one of the two differential pair electrodes of the antenna element transmission line segment is not galvanically connected to the feeding transmission line segment, it is possible to apply an electric potential difference to the two differential pair electrodes of the antenna element transmission line that is independent from any electric potential or electric potential difference of the feeding transmission line segment. Thus, it is possible to make use of phase shifting devices with a tunable dielectric material arranged in between or next to the two differential pair electrodes of the antenna element transmission line and to apply individual bias voltages to each of the phase shifting devices. This allows for a very simple design and operation of the antenna element and of the phase shifting device within each of the unit cells.

According to an aspect, the transition structure comprises two line shaped transition electrodes, whereby the transition structure also comprises an overlapping section with a part of least one of the two line shaped transition electrodes running parallel but at a distance to the feeding transmission line segment for signal coupling from the feeding transmission line segment into the antenna element transmission line segment, whereby each of the two line shaped transition electrodes runs into a corresponding one of the two differential pair electrodes of the antenna element transmission line segment. Thus, the two line shaped transition electrodes can be designed and manufactured to be the respective end sections of the corresponding differential pair electrodes of the antenna element transmission line segment that is designed as differential pair transmission line. The length of the overlapping section and in particular the line shaped transition electrode that runs parallel but at a distance to the feeding transmission line segment can be adapted to belong enough to provide for an adequate coupling, but to be as short as possible in order to reduce the space that is required for the transition structure. As at least one of the two line shaped transition electrodes is not galvanically connected to the feeding transmission line segment. There is no need for e.g. vias or interconnecting electrode structures that provide for a galvanic connection between different surfaces of substrate layers, which allows for simple and cost saving manufacture as well as a space saving design of the transition structure.

In order to provide for a very cost and space saving design of the transition structure, one of the two line shaped transition electrodes s is designed as a balun-type line shaped transition electrode that provides for a phase difference of 180° with respect to the other line shaped transition electrode. A balun-type line shaped transition electrode comprises a U-shaped delay section within provides a simple means to provide for a 180° phase difference for the signal transmission along the antenna element transmission line segment.

A feeding transmission line segment with several and possibly a large number of transition structures that allow for a signal coupling between the feeding transmission line segment and a correspondingly large number of antenna element transmission line segments enables a topology of the phased array antenna device with a very small foot print that is required for the unit cells comprising the respective antenna element, but provides for a very high performance and effectivity as well as a favorable signal to noise ratio of the phased array antenna device when compared to conventional phased array antenna devices that are already known in prior art.

The present invention will be more fully understood, and further features will become apparent, when reference is made to the following detailed description and the accompanying drawings. The drawings are merely representative and are not intended to limit the scope of the claims. In fact, those of ordinary skill in the art may appreciate upon reading the following specification and viewing the present drawings that various modifications and variations can be made thereto without deviating from the innovative concepts of the invention. Like parts depicted in the drawings are referred to by the same reference numerals.

DETAILED DESCRIPTION

Figure 1:
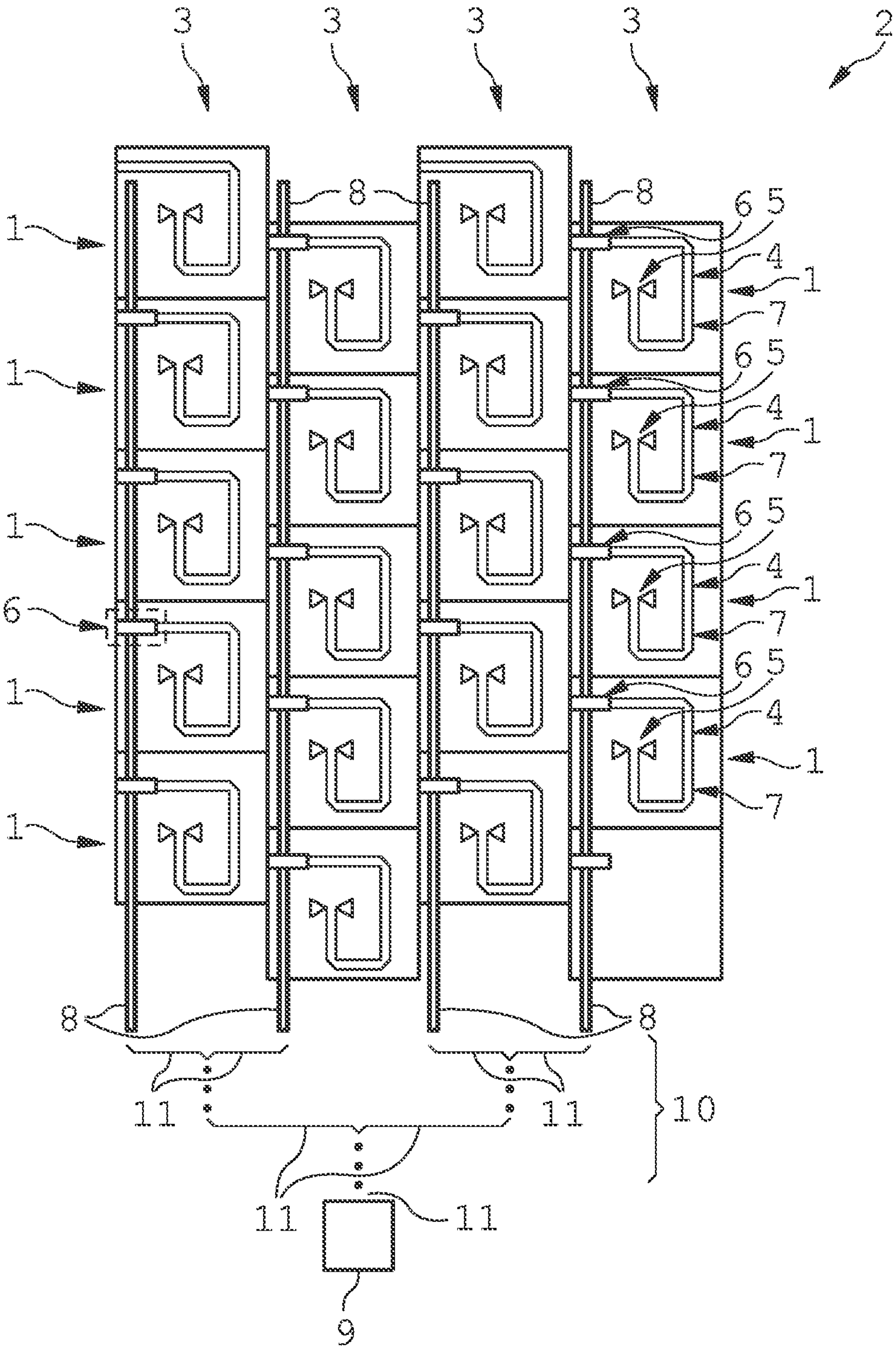
FIG. 1 illustrates a schematic top view of a matrix shaped arrangement of unit cells with several columns of unit cells, whereby each antenna element along a column of unit cells is coupled to a feeding transmission line segment which is designed as a microstrip transmission line.

FIG. 1 illustrates a schematic top view of a matrix shaped arrangement of unit cells 1 within a phased array antenna device 2. The matrix shaped arrangement of unit cells 1 comprises several columns 3 of unit cells 1, whereby adjacent columns 3 of unit cells 1 are positioned with a small offset in the direction of the columns 3. However, such an offset is not mandatory for a matrix shaped arrangement of unit cells 1.

Each of the non-overlapping unit cells 1 comprises an antenna element transmission line segment 4 that runs towards an antenna element 5. The antenna element 5 that is schematically illustrated in FIG. 1 is designed as a bowtie dipole antenna. The antenna element transmission line segment 4 runs from a transition structure 6 located near a border of the unit cell 1 along several bends towards the antenna element 5 that is located near the center of the unit cell 1. At least a part of the antenna element transmission line segment 4 is used as a phase shifting device 7.

Figure 8:
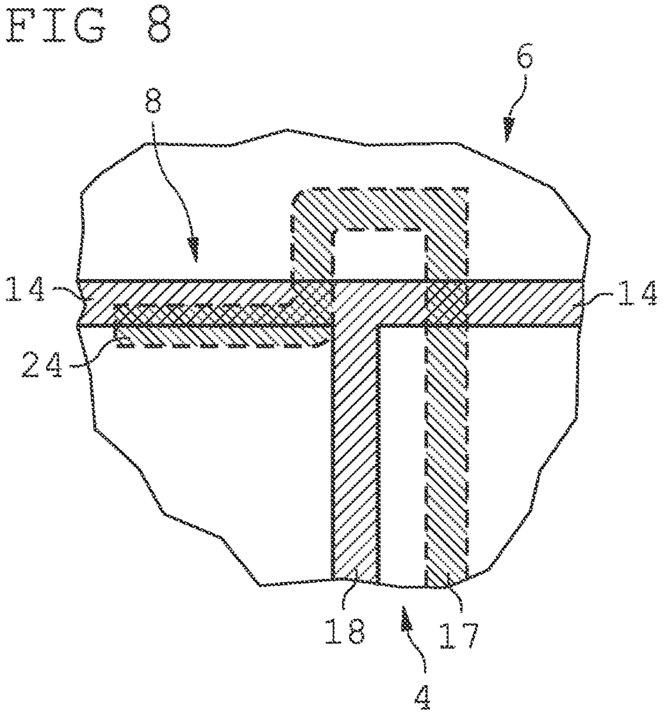
FIG. 8 illustrates a schematic top view of a transition structure that provides for a signal coupling between a microstrip transmission line and a differential pair transmission line.

For each column 3 of the unit cells 1 a feeding transmission line segment 8 runs along the corresponding column 3 and traverses all unit cells 1 within said column 3. Within each unit cell 1 the feeding transmission line segment 8 traverses the corresponding transition structure 6. Within the transition structure 6, a part of a radio frequency signal that is transmitted along the feeding transmission line segment 8 is coupled into the corresponding antenna element transmission line segment 4 and transmitted along this antenna element transmission line segment 4 towards the antenna element 5 of the corresponding unit cell 1. An exemplary design of such a transition structure 6 is illustrated in FIG. 8.

For each unit cell 1 an individual phase shift of the radio frequency signal that is transmitted along the antenna element transmission line segment 4 is preset by the corresponding phase shifting device 7. The radio frequency signals that are emitted from each of the antenna elements 5 superimpose each other, resulting in a peak intensity of the superimposed radio frequency signal that is emitted from the phased array antenna device 2, whereby the direction of the peak intensity can be preset and modified by individually controlling and presetting the phase shift of each of the radio frequency signals of each antenna element 5, i.e. from each of the unit cells 1. In a similar manner it is possible to intensify the sensitivity for receiving radio frequency signals coming from a specific direction with respect to a plane defined by the matrix shaped arrangement of the unit cells 1 by applying a correct phase shift to each of the incoming radio frequency signals that are received by the antenna elements 5 and transmitted along the antenna element transmission line segments 4 towards the respective transition structures 6 and fed into the common feeding transmission line segment 8. Bias voltage lines that are required for applying and controlling an individual phase shift of each phase shifting device 7 must individually connect each of the phase shifting devices 7 with a bias voltage control unit. Such bias voltage lines are not depicted in the figures, but may run within a strip shaped region parallel to the feeding transmission line segments 8 whereby the strip shaped region is arranged between the respective feeding transmission line segment 8 and the row of antenna element transmission line segments 4 adjacent to this feeding transmission line segment 8 but connected to another feeding transmission line segment 8 at the opposite side of the antenna elements 5.

Each feeding transmission line segment 8 is connected to a common control unit 9 via a corporate feed network 10. The corporate feed network 10 comprises a cascading arrangement of corporate feed transmission line segments 11, whereby starting from the control unit 9 each corporate feed transmission line segment 11 branches into two successive corporate feed transmission line segments 11 until after a final branch the corresponding successive corporate feed transmission line segments 11 run into the corresponding feeding transmission line segments 8.

Due to the feeding transmission line segments 8, the number and the total length of the successive corporate feed transmission line segments 11 that are required to transmit the signals between the common control unit 9 and each of the antenna elements 5 is significantly reduced. As each of the corporate feed transmission line segments 11 require some space and a minimum distance to other signal transmitting components like e.g. the antenna element transmission line elements 4 with the phase shifting devices 7, this results in a more compact and space saving design of the matrix shaped arrangement of unit cells 1 and thus of the phased array antenna device 2.

Figure 2:
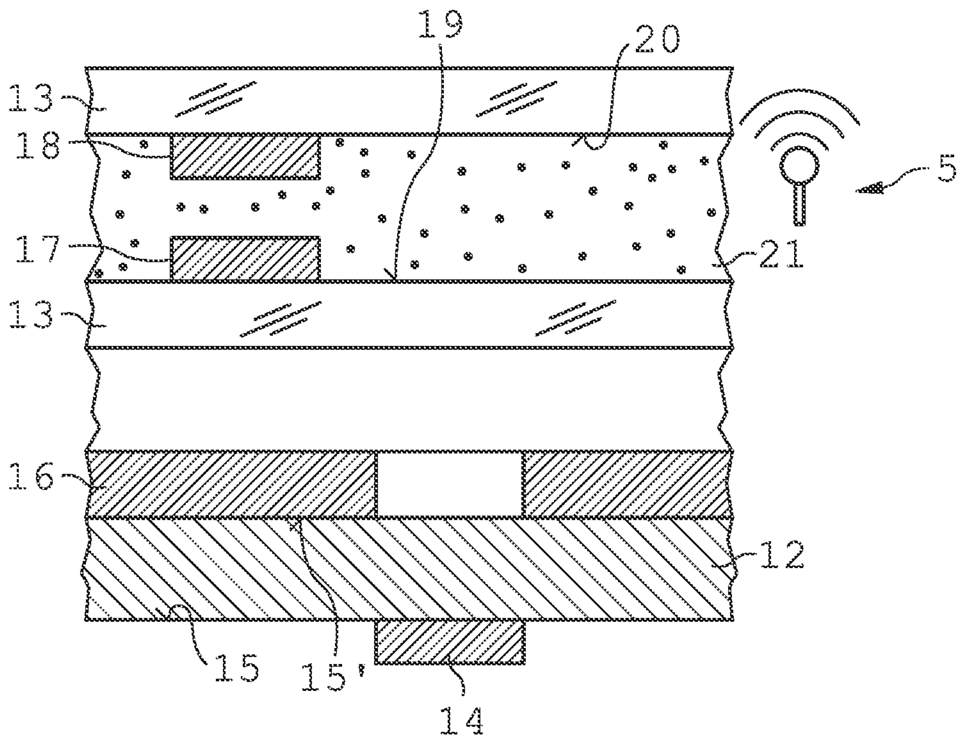
FIG. 2 illustrates a schematic cross-sectional view through a part of a unit cell as shown in FIG. 1.

FIG. 2 illustrates a sectional view of a part of a unit cell 1 shown in FIG. 1. The phased array antenna device 2 comprises a first substrate layer 12 for the feeding transmission line segments 8, and two second substrate layers 13 for the antenna element transmission line segments 4 and the phase shifting devices 7. The two second substrate layers 13 are made of glass, and the first substrate layer 12 can also be made of glass or any other suitable dielectric material. The feeding transmission line segment 8 are designed as microstrip transmission lines with a line shaped microstrip electrode 14 at a first surface 15 of the first substrate layer 12, and with a plane shaped ground electrode 16 at a second surface 15' opposite to the first surface 15. One of the second substrate layers 13 can be in direct contact with the plane shaped ground electrode 16 or arranged at a distance to the plane shaped ground electrode 16 with an intermitting layer of e.g. air or a solid dielectric material, as exemplarily illustrated in FIG. 2.

Each transition structure 8 provides for a signal coupling between the feeding transmission line segment 8 and the corresponding antenna element transmission line segment 4 that is designed as a differential pair transmission line with two differential pair electrodes 17, 18 that are arranged in between the two second substrate layers 13 at opposing but facing surfaces 19, 20. The volume between the two second substrate layers 13 is filled with a tunable dielectric material, e.g. a tunable liquid crystal material 21. Applying an electric potential difference between the two differential pair electrodes 17, 18 results in an electric field that affects the tunable dielectric material, which results in a preset phase shift of the radio frequency signal that is transmitted along the antenna element transmission line segment 4 which also acts as the phase shifting device 7. By presetting individual phase shifts for each of the antenna elements 5 of the unit cells 1, the direction of a peak intensity of a resulting superimposed radio frequency signal that is emitted from the matrix shaped arrangement of the antenna elements 5 can be preset and adapted to provide for enhanced signal communication between the phased array antenna device 2 and any other communication device that emits or receives radio frequency signals that are compatible with the superimposed radio frequency signal of the phased array antenna device 2.

Figure 3:
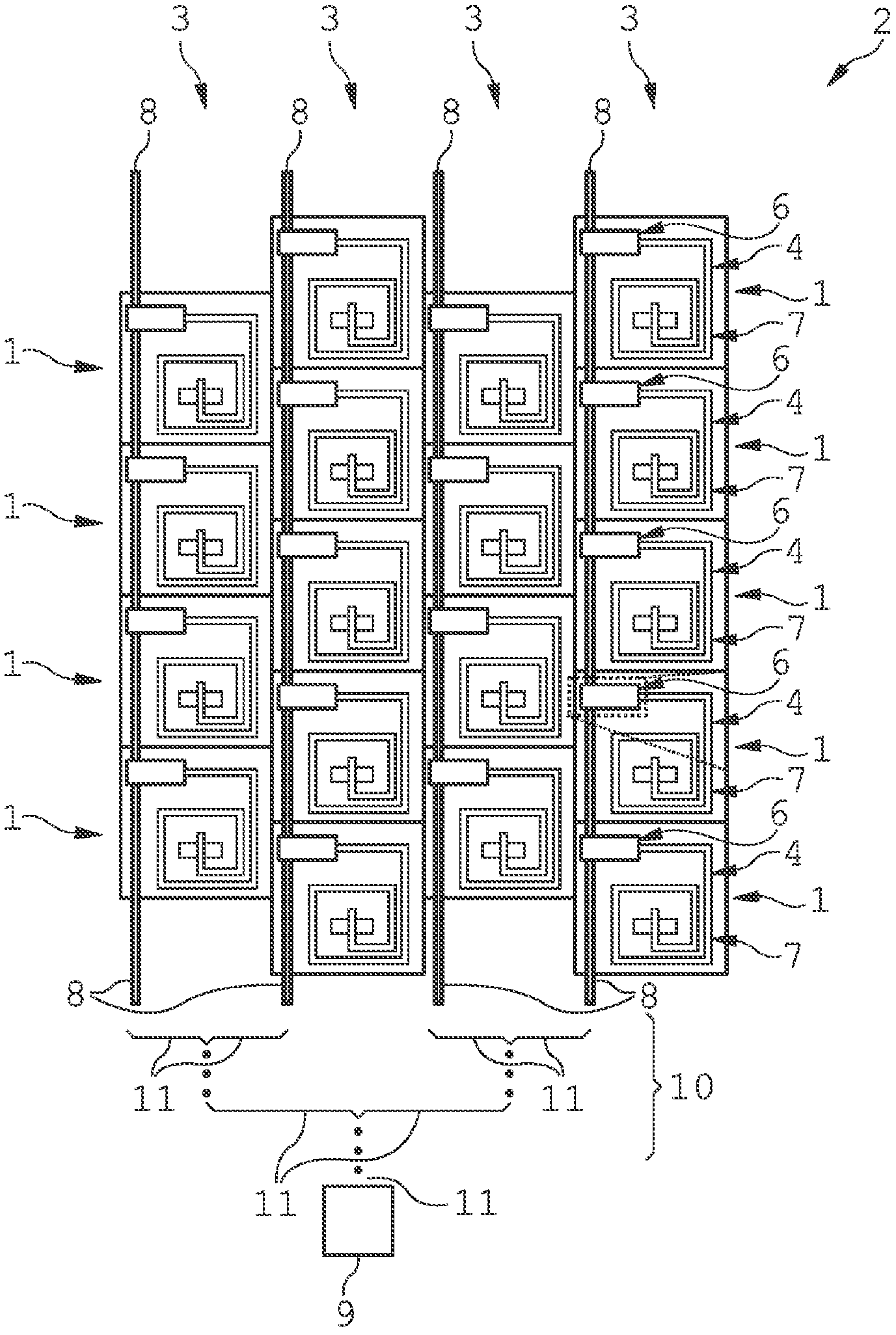
FIG. 3 illustrates a schematic top view of a matrix shaped arrangement of unit cells similar to the arrangement shown in FIG. 1, whereby the feeding transmission line segment as well as antenna element transmission line segments that run towards the respective antenna elements are designed as microstrip transmission lines.
Figure 4:
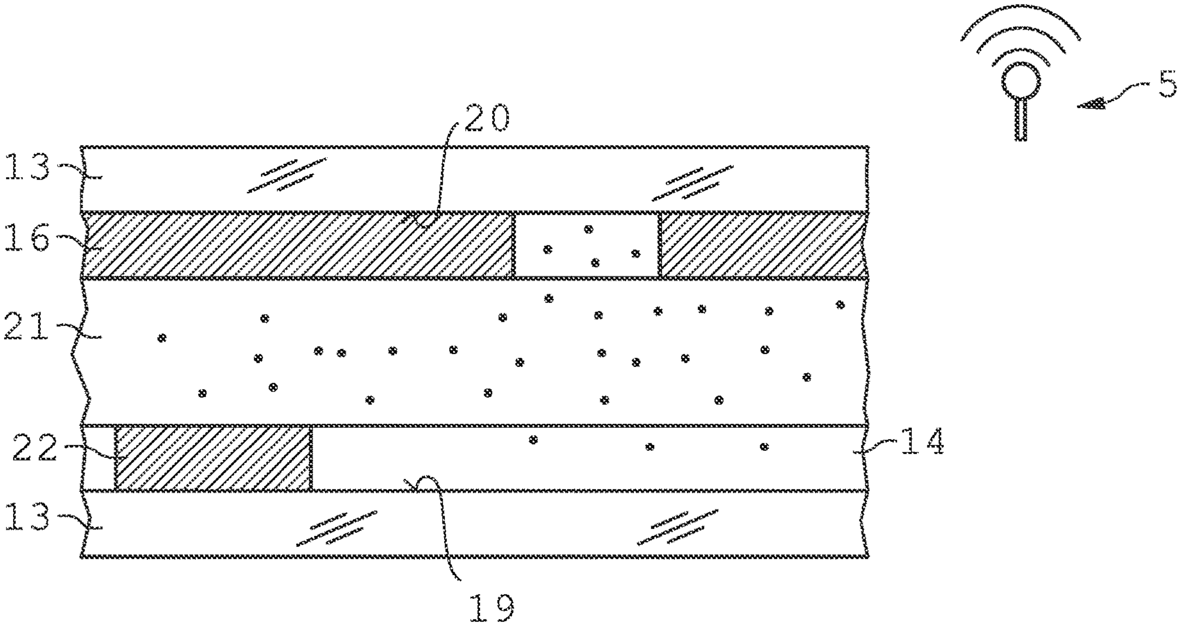
FIG. 4 illustrates a schematic cross-sectional view through a part of a unit cell as shown in FIG. 3.
Figure 7:
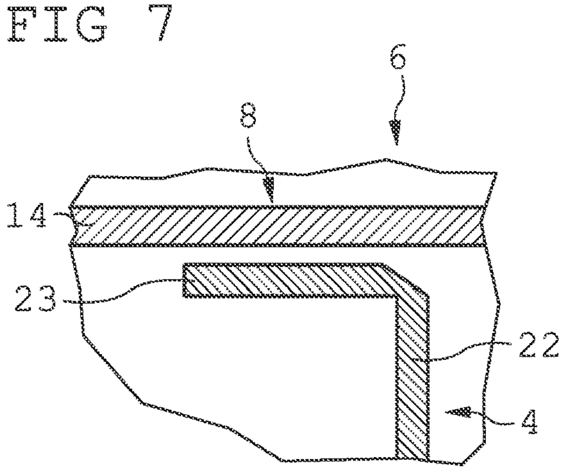
FIG. 7 illustrates a schematic top view of a transition structure that provides for a signal coupling between a microstrip transmission line and a microstrip transmission line.

FIGS. 3 and 4 illustrate another embodiment of the phased array antenna element 2. Both, the feeding transmission line segments 8 and the antenna element transmission line segments 4 are designed as microstrip transmission lines. Thus, there are only two second substrate layers 13 required. The plane shaped ground electrode 16 and the line shaped microstrip electrode 14 of the feeding transmission line segment 8 are arranged between the two second substrate layers 13 at opposing but facing surfaces 19, 20. The line shaped microstrip electrode 14 of the feeding transmission line segment 8 and a line shaped microstrip electrode 22 of the antenna element transmission line segments 4 are arranged at the same surface 19, whereby the plate shaped ground electrode 16 is arranged on the other surface 20. The volume between the two second substrate layers 13 is filled with a tunable dielectric material, e.g. a tunable liquid crystal material 21. An exemplary design of the transition structure 6 that couples the radio frequency signal between the feeding transmission line segment 8 and the corresponding antenna element transmission line segment 4 is illustrated in FIG. 7. For each unit cell 1 and the corresponding antenna element 5 that is designed as a patch antenna and that is not shown in FIGS. 3 and 4, the correct phase shift can be preset by applying the corresponding electric potential difference between the line shaped microstrip electrode 22 and the plate shaped ground electrode 16 of the antenna element transmission line 4, as the line shaped microstrip electrode 22 is not galvanically connected to the feeding transmission line segment 8.

Figure 5:
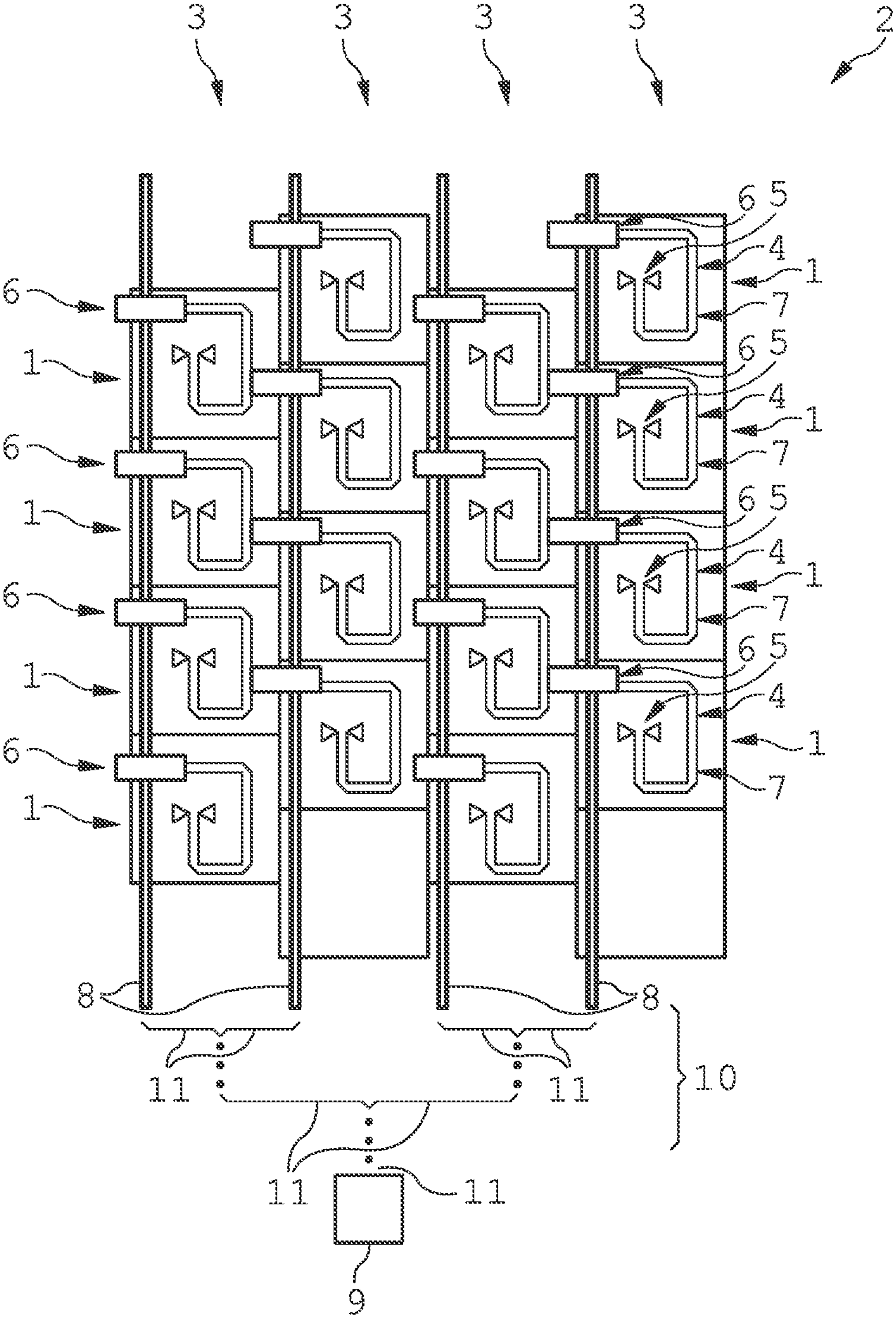
FIG. 5 illustrates a schematic top view of a matrix shaped arrangement of unit cells similar to the arrangements shown in FIGS. 1 and 3, whereby the feeding transmission line segment is designed as a microstrip transmission line and whereby the respective antenna element transmission line segments are designed as differential pair transmission lines.
Figure 6:
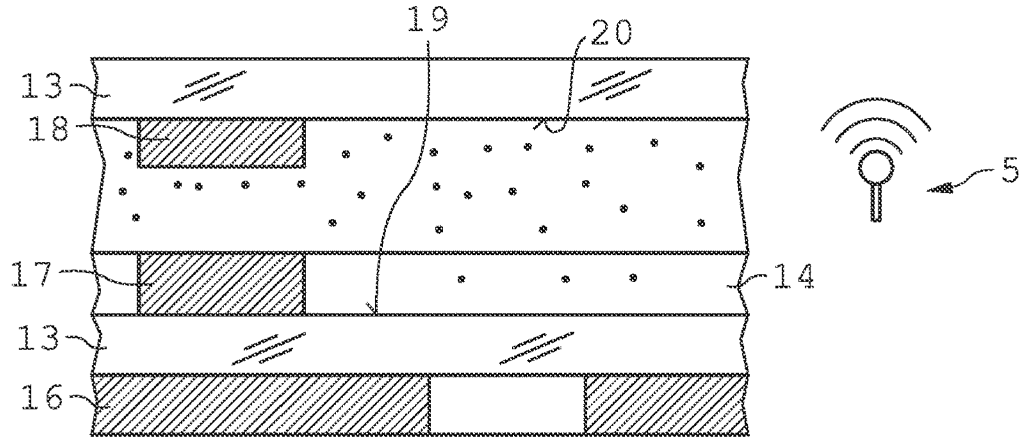
FIG. 6 illustrates a schematic cross-sectional view through a part of a unit cell as shown in FIG. 5.

FIGS. 5 and 6 illustrate yet another embodiment of the phased array antenna device 2 with only two second substrate layers 13, whereby the feeding transmission line segment 8 is designed as a microstrip transmission line and whereby the antenna element transmission line segments 5 are designed as differential pair transmission lines.

FIG. 7 schematically illustrates an exemplary embodiment of a transition structure 6 that can be used to couple a radio frequency signal between two microstrip transmission lines. The line shaped microstrip electrode 14 of the feeding transmission line segment 8 runs along a straight line. An end section 23 of the line shaped microstrip electrode 22 of the antenna element transmission line segment 4 forms a line shaped transition electrode and runs parallel but at a distance to the line shaped microstrip electrode 14 of the feeding transmission line segment 8, whereby the length of the parallel section of the line shaped microstrip electrode 22 is adapted and preset to provide for a strong signal coupling of a radio frequency signal between the line shaped microstrip electrode 14 of the feeding transmission line segment 8 and the line shaped microstrip electrode 22 of the antenna element transmission line segment 4.

FIG. 8 schematically illustrates another exemplary embodiment of a transition structure 6 that allows for the coupling of a radio frequency signal between a microstrip transmission line and a differential pair transmission line. An end section 24 of the first line shaped differential pair electrode 17 forms a line shaped transition electrode and runs parallel but at a distance and preferably at another substrate to the line shaped microstrip electrode 14 of the feeding transmission line segment 8. For clarification purposes the first line shaped differential pair electrode 17 is illustrated with dashed lines. After the end section 24, the first line shaped differential pair electrode 17 runs along a U-shaped delay course that results in a 180° phase shift with respect to the signal that is coupled into the second line shaped differential pair electrode 18. The U-shaped delay course can also be regarded as being part of the line shaped transition electrode of the transition structure 6. The second line shaped differential pair electrode 18 can be connected or coupled with or without a galvanic connection to the line shaped microstrip electrode 14 of the feeding transmission line segment 8. FIG. 8 illustrates a galvanic connection designed as a branch of the line shaped microstrip electrode 14 of the feeding transmission line segment 8 into a branching line shaped differential pair electrode 18 of the antenna element transmission line segment 4.

While the present invention has been described with reference to exemplary embodiments, it will be readily apparent to those skilled in the art that the invention is not limited to the disclosed or illustrated embodiments but, on the contrary, is intended to cover numerous other modifications, substitutions, variations and broad equivalent arrangements that are included within the spirit and scope of the following claims.

The invention claimed is:

1. A phased array antenna device (2), comprising:

at least one antenna element (5) arranged in a spatial distribution that allows the phased array antenna device (2) to emit and receive superposing radio frequency signals to and from different directions, wherein each antenna element (5) is positioned within a corresponding unit cell (1) of the phase array antenna device (2) and wherein the unit cells (1) are arranged in a non-overlapping manner next to each other;

a feeding network for transmitting antenna signals between a common feeding point and the respective antenna element (5), wherein the feeding network comprises a plurality of antenna element transmission line segments (4) each running into an antenna element (5);

a plurality of phase shifting devices (7), wherein for each antenna element (5) a corresponding phase shifting device (7) is arranged along the respective antenna element signal transmission line (4) that runs into said antenna element (5); and a plurality of feeding transmission line segments (8), wherein each feeding transmission line segment (8) comprises more than two transition structures (6) distributed along the feeding transmission line segment (8), wherein each transition structure (6) provides for a signal coupling between the feeding transmission line segment (8) and the corresponding antenna element transmission line segment (4), thereby connecting several dedicated antenna element transmission line segments (4) with the same feeding transmission line segment (8).

2. The phased array antenna device (2) according to claim 1, wherein each of the feeding transmission line segments (8) runs along or through more than two unit cells (1) and comprises one transition structure (6) for each of the more than two unit cells (1).

3. The phased array antenna device (2) according to claim 1, wherein each of the feeding transmission line segments (8) runs along a straight line.

4. The phased array antenna device (2) according to claim 1, wherein the feeding transmission line segments (8) are implemented as microstrip transmission lines with a microstrip line arranged at a distance to a ground electrode (16).

5. The phased array antenna device (2) according to claim 1, wherein the feeding transmission line segments (8) are implemented as differential pair transmission lines with two similar differential pair electrodes running along the feeding transmission line segment (8).

6. The phased array antenna device (2) according to claim 1, wherein each of the antenna element transmission line segments (4) is implemented as differential pair transmission line with two similar differential pair electrodes (17, 18) running along the antenna element transmission line segment (4), and wherein at least one of the two differential pair electrodes (17, 18) of the antenna element transmission line segment is galvanically isolated from the corresponding feeding transmission line segment (8).

7. The phased array antenna device (1) according to claim 6, wherein the transition structure (6) comprises two line shaped transition electrodes, wherein the transition structure comprises an overlapping section with a part of least one of the two line shaped transition electrodes running parallel but at a distance to the feeding transmission line segment (8) for signal coupling from the feeding transmission line segment (8) into the antenna element transmission line segment (4), wherein each of the two line shaped transition electrodes runs into a corresponding one of the two differential pair electrodes (17, 18) of the antenna element transmission line segment (4).

8. The phased array antenna device (2) according to claim 7, wherein one of the two line shaped transition electrodes is designed as a balun-type line shaped transition electrode that provides for a phase difference of 180° with respect to the other line shaped transition electrode.

* * * * *